April 10, 1951     E. V. BERGSTROM     2,548,285
METHOD AND APPARATUS FOR HYDROCARBON CONVERSION
Filed Aug. 15, 1947     4 Sheets-Sheet 2

INVENTOR.
ERIC V. BERGSTROM
BY
John A. Crowley, Jr.
AGENT OR ATTORNEY

April 10, 1951 E. V. BERGSTROM 2,548,285
METHOD AND APPARATUS FOR HYDROCARBON CONVERSION
Filed Aug. 15, 1947 4 Sheets-Sheet 3

FIG. 3.

INVENTOR.
ERIC V. BERGSTROM
BY
John A. Crowley, Jr.
AGENT OR ATTORNEY

April 10, 1951 E. V. BERGSTROM 2,548,285
METHOD AND APPARATUS FOR HYDROCARBON CONVERSION
Filed Aug. 15, 1947 4 Sheets-Sheet 4

FIG. 6.

*INVENTOR.*
ERIC V. BERGSTROM
BY
John A. Crowley, Jr.
*AGENT OR ATTORNEY*

Patented Apr. 10, 1951

2,548,285

UNITED STATES PATENT OFFICE 2,548,285

METHOD AND APPARATUS FOR HYDROCARBON CONVERSION

Eric V. Bergstrom, Short Hills, N. J., assignor to Socony-Vacuum Oil Company, Incorporated, a corporation of New York Application August 15, 1947, Serial No. 768,800

13 Claims. (Cl. 196—52)

This invention pertains to systems wherein fluid reactants are contacted with moving beds of particle-form solid contact materials. It is particularly concerned with a cyclic system for conversion of fluid hydrocarbons in the presence of a substantially compact moving column.

Typical of such conversion processes is one wherein a particle-form adsorbent catalyst is moved cyclically through a conversion zone wherein it moves as a substantially compact column while being contacted with vaporized hydrocarbons for the purpose of converting them to lower boiling hydrocarbons such as gasoline and then through a regeneration zone wherein it moves as a substantially compact column while being contacted with a combustion supporting gas such as air to burn off from the catalyst carbonaceous contaminants deposited thereon in said conversion zone. This invention relates specifically to a method and apparatus for achieving uniform size distribution of contact material particles in the moving columns of solids in such systems. It is particularly concerned with method and apparatus for achieving uniform size distribution in a moving bed of solids supplied from a source above and to one side of the center of the bed.

In such catalytic moving-bed type systems the catalyst may partake of the nature of natural or treated clays, synthetic associations of silica, alumina or silica or alumina or inert carriers bearing deposits of certain metallic oxides and the like. The invention is not considered to be limited to catalytic conversion systems but is intended to cover thermal conversion systems and heat exchange systems and the like wherein a substantially inert particle-form solid material moves cyclically through two or more zones in at least some of which it flows by gravity as a substantially compact column. In such systems the contact material may take the form of particles of refractory material, or even of metal. In any event, the normal condition of the contact material as used commercially includes particles of varying sizes within a predetermined size range. For example, in the catalytic cracking of hydrocarbon oils the catalyst particles may desirably fall within the range about 4 to 20 mesh. A small amount of fines formed by attrition of the normal sized particles will also be present.

In such systems wherein the contact material made up of particles of varying size is moved cyclically through two or more zones there is a pronounced tendency for the particles in the moving stream in certain parts of the system to classify according to size. For example, when the contact material is conveyed in elevator buckets between reaction zones the fines tend to settle towards the bottoms of the buckets. Similarly when the contact material passes from an elevator discharge to a surge hopper or to the reaction zone through a downwardly sloping chute, the smaller sized particles tend to settle to the bottom of the stream flowing in the chute.

This tendency for classification of particles of different sizes results in serious difficulties in such moving bed reaction systems. When the classified stream is fed on to the surface of the column in a reaction zone, the large particles are found on one side of the column and the smaller particles on the other side thereof, or localized veins of concentrated fines may occur through the column. Flow characteristics of a fluid medium passing through the column of contact material in the reaction zone will differ between the two sides of the column due to the classification of the granules. As a result non-uniform conversion of the hydrocarbon reactants is obtained and non-uniform coke deposits occur on the catalyst. In the regenerator the same difficulty arises and uneven regeneration of the catalyst results.

A major object of this invention is the provision, in a system wherein contact material of varying particle sizes is contacted as a substantially compact moving column with fluid reactants of a method and apparatus for supplying contact material to said column across its entire horizontal cross-sectional area uniformly both with respect to size of particles and amount.

Another object of this invention is the provision in a cyclic moving column type hydrocarbon conversion system wherein granular catalysts pass cyclically through a reactor and regenerator of a method and apparatus for supply of contact material particles of all sizes present substantially uniformly across the entire surface of each of said columns.

These and other objects of the invention will become apparent from the following discussion of the invention.

The invention may be most easily understood by reference to the drawings attached hereto of which

All of these drawings are highly diagrammatic in form.

Figure 1:
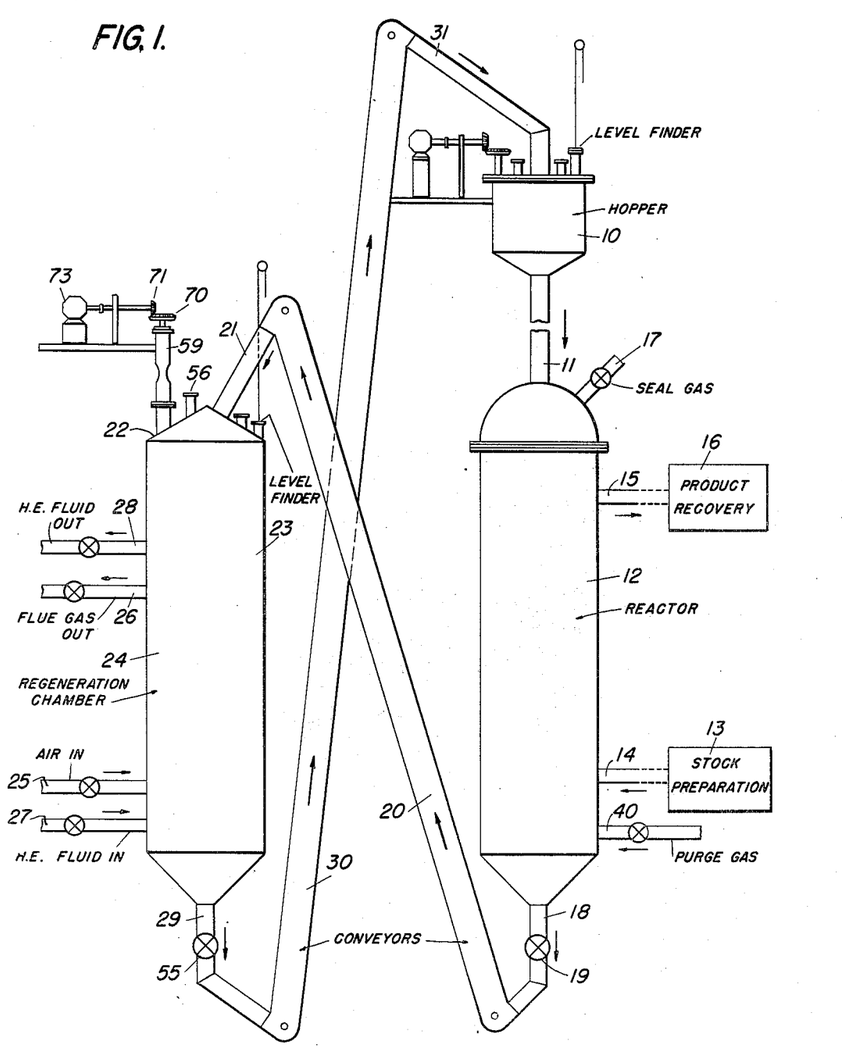
Figure 1 is an elevational view showing the general arrangement of a cyclic hydrocarbon conversion system of the type to which this invention pertains.

Turning now to Figure 1 there is shown a cyclic system for catalytic conversion of high boiling hydrocarbons such as gas oil fractions to gasoline and other products. Catalyst is particleform, varying in size, for example, 4–20 mesh (Tyler Screen Analysis) catalyst, passes from a supply hopper 10 downwardly through an elongated gravity feed leg 11 into the upper end of reaction vessel 12. The catalyst moves downwardly through vessel 12 as a substantially compact column while being contacted with hydrocarbon vapors introduced from stock preparation system 13 of conventional type into the lower section of vessel 12 via conduit 14. The gaseous hydrocarbon products pass from the upper section of the vessel 12 through conduit 15 to the product recovery system 16. The escape of hydrocarbons through the feed leg 11 is prevented by maintaining a blanket of an inert seal gas such as steam or flue gas within the upper end of vessel 12. The seal gas is introduced through conduit 17. Spent catalyst bearing a carbonaceous deposit is withdrawn from the lower end of vessel 12, through conduit 18 at a suitable rate controlled by valve 19. The catalyst is purged substantially free of gaseous hydrocarbons before being withdrawn from vessel 12 by means of an inert purge gas such as steam or flue gas introduced at 40. The spent catalyst passes to conveyor 20 by which it is conducted to sloping supply duct 21 which supplies catalyst to the upper section of regenerator vessel 22. Regenerator vessel 22 is comprised of an upper catalyst surge chamber 23 and a communicating lower burning chamber 24. Air is introduced to the burning chamber near its lower end through conduit 25. The air moves upwardly through the column of gravitating catalyst particles in burning chamber 23 so as to burn off the carbonaceous deposit therefrom and is withdrawn near the upper end of chamber 23 through conduit 26. A suitable heat exchange fluid is introduced to heat transfer tubes (not shown) within the chamber 23 via conduit 27. The fluid passes through the heat transfer tubes to remove the excess heat of contaminant combustion from the catalyst and is withdrawn from the tubes via conduit 28. Regenerated catalyst passes from the lower end of chamber 23 via conduit 29 to conveyor 30 by which it is conducted to the downwardly sloping duct 31 supplying hopper 10. The conveyors 20 and 30 may be of any suitable type adapted to transfer particle-form solids at elevated temperatures without excessive attrition of the solid particles. Continuous bucket elevators, for example, have been found to be satisfactory for this purpose. It will be understood that the reactor and regenerator vessels may vary somewhat from the particular construction described hereinabove. For example, the regenerator may be of the multistage type comprised of a vertical series of alternating burning and cooling zones, each burning zone having a separate gas inlet and outlet and each cooling zone having a separate set of heat transfer tubes therein and separate external manifolding associated with said heat transfer tubes.

Figure 2:
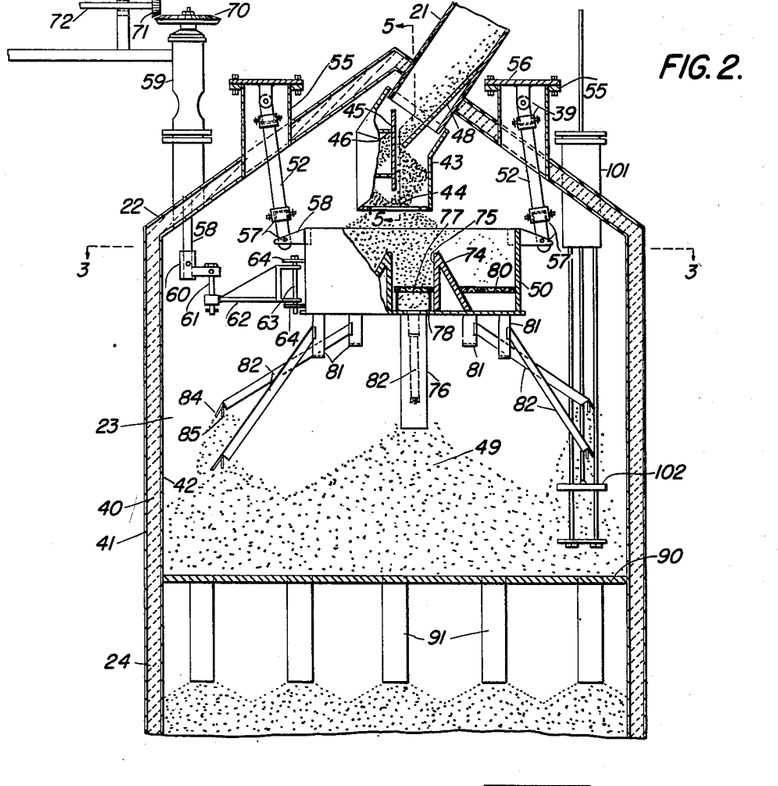
Figure 2 is a vertical view, partially in section, showing in detail the upper section of one of the chambers of Figure 1 and the application of the apparatus of the invention thereto.
Figure 3:
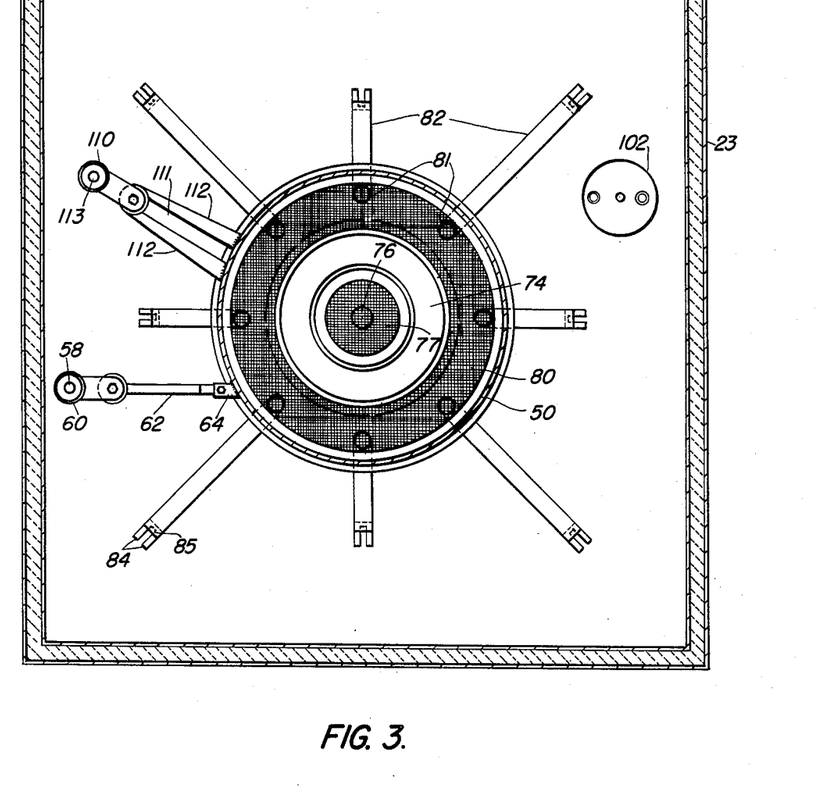
Figure 3 is a horizontal cross-sectional view taken along line 3—3 of Figure 2.
Figure 4:
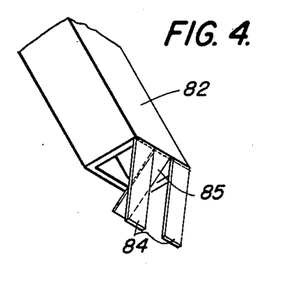
Figure 4 is an isometric view of one of the elements of the apparatus shown in Figure 2.
Figure 5:
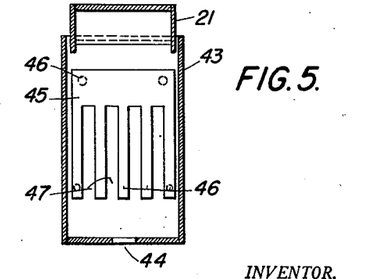
Figure 5 is a sectional view taken along 5—5 of Figure 2.

Turning now to Figure 2 there is shown the upper section of the catalyst burning chamber 24 and the surge chamber 23 thereabove. These chambers are rectangular in horizontal cross-sectional area in the modification shown but may be of other shape. The walls of the burning and surge chambers consist of a layer of insulation 40 lined on either side with metal sheets 41 and 42. A catalyst feed duct 21 which may be of rectangular cross-sectional shape extends into the upper section of the surge chamber 23, and terminates on its discharge end in a mixing device 43. The device 43 is a rectangular box having a centrally located catalyst outlet opening 44 in its bottom. A vertical baffle plate 45 is supported within device 43 by means of rods 46 substantially centrally over the opening 44. As may be seen from Figure 5, the baffle 45 extends horizontally across the device 43 and is constructed like a fork having downwardly extending prongs or fingers 46 and vertical openings 47 therebetween. A deflector plate 48 deflects the catalyst flow enetring the device 43 directly against the fork like baffle plate 45 at the level of the fingers 46. Positioned below the mixing device 43 is a basin 50 having vertical sides. The basin may be preferably of circular cross-sectional shape although other shapes may be employed. The basin is suspended within the chamber 23 by means of rods 52, there being four rods, one at each quadrant. Four flanged nipples 55 connect into the top of the vessel 22 and are closed on their upper ends by blank flanges 56. Each rod 52 is connected on its upper end through a universal joint type connection 39 to one of the flanges 56 and each rod is connected on its lower end through a similar universal joint type connection 57 to a support lug 58 which is attached to basin 50. The arrangement is such as to permit free movement of the basin 50 in all horizontal directions. A drive shaft 58 extends downwardly into the upper section of chamber 23 through a suitable mounting 59. A crank arm 60 is connected to the lower end of the shaft 58. The crank arm is connected by the loose fitting bolt 61 to the connecting member 62 which is connected loosely to the lugs 64 on basin 50 by means of bolt 63. A flat gear 70 is connected tightly to the upper end of shaft 58 and the gear 70 in turn meshes with a gear 71 on the power shaft 72 which is in turn rotated by a motor 73 shown in Figure 1. A second crank arm 110 not visible in Figure 2 but shown in Figure 3 is provided on the same side of the vessel as crank arm 60, and arm 110 is rigidly connected to the basin through bar 111 and stiffener 112. The crank arm 110 is driven through a shaft 113 and gear similarly to arm 60. The same motor may preferably be geared to drive both crank arms. The arrangement is such that the rotation of shafts 58 and 113 impart an oscillatory motion to the basin 50. Referring now to Figures 2 and 3 together, an upright truncated, hollow conical baffle 74 is positioned centrally on the bottom of the basin 50. A cylindrical vertical wall 75 extends upwardly from the bottom of basin 50 and connects to the upper edges of the truncated conical member 74. A conduit 76 depends centrally from the bottom of the basin 50. A circular screen 77 is supported by rods 78 over the inlet to the conduit 76 and an annular shaped screen 80 extends horizontally between the conical member 74 and the vertical wall of the basin 50. A circular row of uniformly spaced vertical conduits 81 depend from that portion of the bottom of the basin 50 which is under the annular screen 80. These conduits 81 are closed on their lower ends. A downwardly sloping duct 82 which may be of rectangular cross-sectional shape connects into each of the conduits 81. The slope of the ducts 82 with the horizontal should be about 40° or more. The ducts 82 are of such length and are so arranged as to discharge on their lower ends at a plurality of points uniformly distributed over the horizontal cross-sectional area of the chamber 23. Thus in the arrangement shown the cross section of the chamber 23 may be imagined to be divided into nine areas of equal area, the central area being supplied with catalyst from conduit 76 and each of the remaining eight areas being supplied with catalyst substantially centrally by one of the sloping ducts 82. In order to better distribute the catalyst over each area, side by side finger baffles 84 and 85 are connected to the lower end of each duct as is shown in Figure 4. The finger baffles 84 and 85 are positioned at different angles so as to deflect the catalyst to different portions of the area supplied. A horizontal partition 90 forms the bottom of chamber 23 and catalyst may flow from chamber 23 to the burning chamber 24 through a plurality of uniformly spaced conduits 91 which depend from partition 90.

In operation a catalyst stream passes down the flat bottomed duct 21 which is of substantial horizontal width. The smaller sized material tends to segregate on the bottom of this stream. This catalyst stream is directed against baffle 45 so that it is vertically split into a plurality of side by side components. Alternate components pass through the vertical openings 47 and impinge against the wall of device 43 in back of the baffle 45. The remaining alternate components are deflected by fingers 46 towards the opposite wall of the mixing device 43. It will be noted that since the split of the catalyst stream is vertical and transversely to the horizontal width of the stream, and the segregation in the stream in duct 21 was in horizontal layers, each component has substantially the same total distribution of sizes as catalyst as the stream in duct 21. Thus the tendency for all of the smaller material to concentrate along the side of the device 43 nearest the elevator 20 or duct 21 has been overcome. The two sets of catalyst stream components are then deflected by opposite walls of device 43 towards the center of the device and towards each other and also downward towards the central bottom opening 44. As a result the two sets of components converge and mix together just over the central opening 44 to form again a single stream which flows through the opening 44. The segregation of small and coarse particles is substantially less pronounced in stream passing through opening 44 than in the original stream in duct 21, and in many instances the catalyst is uniformly mixed with respect particle size in the stream passing through opening 44. The catalyst stream passing through opening 44 discharges partially into the central shaft defined by wall 75 on basin 50 and partially onto that side of the conical frustum 74 which is in line below the opening 44. The basin 50 is slowly oscillated in a circular path so that at any instant only one side of the conical frustum is in line below opening 44 but so that all portions of the conical frustum eventually pass in line below opening 44 as the basin oscillates. As a result, while all of the ducts 82 are supplied with the same amount of catalyst over a period of time, still at any instant all of the catalyst flow from opening 44 (excepting a small portion passing through conduit 76), is delivered to a single location feeding only one or a relatively small number of the ducts 82. In this manner, regardless of any segregation of particle size in the stream passing through opening 44, since substantially all of the catalyst stream flowing at any instant passes to a single or a relatively few ducts 82, it can be insured that catalyst of the same size distribution is supplied to all of the ducts 82. The ducts 82 in turn direct substantially identical catalyst streams to a plurality of points uniformly distributed over the horizontal cross-sectional area of the chamber 23. The catalyst discharges from the lower ends of ducts 82, being dispersed by fingers 84 and 85 and rains down onto the surface 100 of the bed of catalyst maintained in the surge chamber. The level of the bed surface will fluctuate somewhat during the operation and may be indicated by means of a surface level indicator 101 which may be of any suitable type. The indicator shown at 101 is of the float type, the float 102 being periodically raised and dropped onto the bed surface level.

The central conduit 76 is of such size as to have a flow capacity slightly greater than any one of the ducts 82 so as to insure that the high point of the bed surface will always be at the same location, namely the center. Thus if the catalyst from one side of the chamber 23 is withdrawn therefrom more rapidly than from the other side due to some temporary flow disturbance in the regenerator therebelow, excess catalyst from the central conduit 76 may flow to the side of highest withdrawal so as to prevent a low surface level in that location. This feature insures a bed surface 49 of the same shape and slope at all times thereby permitting accurate indication of the surface level by device 101 at all times. The length of conduit 76 is such that when the bed surface builds up at the center to the level of the discharge end of conduit 76, the bed surface is still below the discharge ends of all ducts 82.

The screens 77 and 80 are of substantially larger mesh size than the catalyst particles and have for their purpose the trapping of any large pieces of foreign matter which might become lodged in the fingers 84 and 85 at the discharge ends of ducts 82.

The opening in the top base of baffle 74 may preferably be of about the same size as opening 44 or somewhat larger. In all cases the radius of oscillation should be less than the diameter of the opening in the top base of baffle 74. An oscillation speed of about 1 to 10 revolutions per minute is satisfactory.

The spacing of basin 50 below opening 44 and the relative diameters of the opening 44 and basin 50 should be such that catalyst cannot overflow the sides of basin 50. In general this may be accomplished if the arrangement is such that a line drawn from the edge of opening 44 downwardly at an angle of about 30-35 degrees with the horizontal intersects the nearest side of basin 50 below its upper edge.

It will be understood that the number of conduits 81 and ducts 82 employed will vary depending upon the cross-sectional area of the vessel 23.

As an example, for a vessel measuring about 11 feet in either horizontal dimension, 48 conduits 81 arranged on a 5 foot diameter circle were provided in addition to the central conduit 76. The flow capacity of the central conduit in this example was about 10% of total capacity of the 48 ducts 82. In this example the opening 44 measured 10″ in diameter and the basin was oscillated at a rate of 3–5 revolutions per minute on a 5½ inch radius. The opening in the top base of baffle 74 was about 19 inches in diameter.

The operation of this invention may be contrasted with that of the prior art. In the usual prior art operation the catalyst from the elevator 20 passes through a downwardly sloping duct or conduit 21 directly onto the surface of the column of catalyst 49 in chamber 23. Some classification of fines from coarser particles has occurred in the elevator buckets. In the sloping duct 21 more classification occurs, the fines settling to the bottom of the stream in duct 21 so as to be supplied mostly onto the left side of the column 49 in chamber 23, (i. e. on that side of the column nearest to the conveyor 20). As a result the undersized catalyst particles tend to move downwardly through the regenerator 22 on one side thereof while the larger particles tend to move downwardly through the other side of the regenerator. Consequently, there will be an excessive rate of gas flow through that portion of the column offering the least resistance, namely the portion in which the larger catalyst particles are concentrated. There will also occur too little gas flow in the remaining portions of the vessel horizontal cross-sectional area. Uneven regeneration of the catalyst and localized overheating of the catalyst during its regeneration is the result.

When the method and apparatus of this invention is employed, classification of particles of catalyst of different sizes still occurs in elevator 20 and duct 21, but this is overcome by the mixing device 43 and the basin 50 with ducts 82, and the supply of catalyst of different particle size composition to different portions of the horizontal cross-section of column 49 is avoided. The surface of the column 49 is maintained at all points within a range of levels below the lower end of conduit 76 and above the partition 90 by adjusting the valve 55 on drain conduit 29 shown in Figure 1 in the manner indicated as necessary by the level indicator 101. If desired the valve 55 may be automatically operated by an instrument actuated by a suitable level indicator in surge chamber 23.

A similar arrangement for feed catalyst distribution may be provided in the reactor surge hopper 10 as is indicated in Figure 1 of the drawings.

Figure 6:
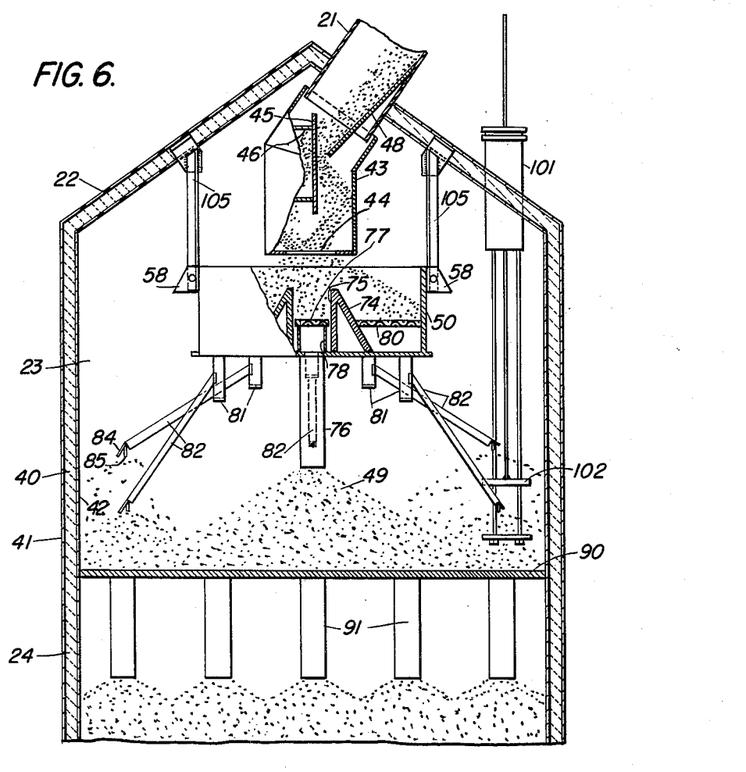
Figure 6 is a vertical view, partially in section showing a modified form of the invention.

Turning now to Figure 6, there is shown a less preferred form of the invention in which the basin 50 is stationary and the mixing device 43 serve principally to overcome segregation of particle size while the basin 50 and ducts 82 serve to insure distribution of uniform amounts of catalysts to all portions of the vessel horizontal cross-sectional area. The apparatus shown in Figure 6 is similar to that in Figure 2 except as hereinafter discussed and like elements bear like symbols. In the apparatus of Figure 6 the basin 50 is suspended from the roof of chamber 23 by rods 105 in fixed position. The opening 44 in device 43 is located centrally over the frustoconical member 74 and the opening 44 is somewhat larger than diameter of cylindrical wall 75 so that catalyst may flow continually onto all sides of the member 74 as well as into the central space defined by wall 75. As in the case of the apparatus shown in Figure 2, the basin 50 is so spaced below opening 44 and is of such diameter relative to that of opening 44 that the catalyst flowing from opening 44 cannot overflow the sides of the basin.

While the form of the invention shown in Figure 6 may be satisfactorily employed in some applications, where the segregation is severe and the horizontal cross-section of the catalyst surge chamber is large, the form shown in Figure 2 is preferred.

It should be understood that the details of construction and of application of this invention given hereinabove are intended merely as exemplary and should not be so construed as limiting the scope of this invention except as it is limited in the following claims.

I claim:

1. In a cyclic process for the conversion of hydrocarbons wherein a particle-form solid contact material is passed cyclically through a first reaction zone wherein it moves downwardly as a substantially compact column while being contacted with hydrocarbon reactants to effect the conversion thereof and through a second reaction zone wherein it moves downwardly as a substantially compact column while being contacted with a combustion supporting gas to burn off the contact material the carbonaceous material deposited thereon in the first reaction zone, the method of uniformly distributing the contact material onto the column thereof in one of said zones which comprises: passing a single stream of said contact material in which the particles are segregated at least partially in layers according to size into said reaction zone above the surface of the column therein, splitting said stream across the layers of segregation thereby forming a plurality of separate components each having substantially the same distribution of sizes of particles as said single stream, recombining said components to form a single stream by causing them to turbulently converge together, flowing said single stream downwardly and dividing it vertically into a plurality of confined streams of contact material each having substantially the same distribution of particle sizes and flowing said last named confined streams to a plurality of spaced locations uniformly distributed over the horizontal cross-sectional area of said reaction zone and passing the contact material downwardly from said locations onto the surface of said column.

2. In a cyclic process for the conversion of hydrocarbons wherein a particle-form solid contact material is passed cyclically through a first reaction zone wherein it moves downwardly as a substantially compact column while being contacted with hydrocarbon reactants to effect the conversion thereof and through a second reaction zone wherein it moves downwardly as a substantially compact column while being contacted with a combustion supporting gas to burn off of the contact material carbonaceous material deposited thereon in the first reaction zone, the method for uniformly distributing the contact material onto the column thereof in one of said zones which comprises: maintaining a substantially compact supply bed of said contact material in a confined supply zone above and communicating with the column of contact material in said conversion zone through a plurality of uniformly spaced vertical, compact, gravitating streams of contact material, passing a single downwardly sloping stream of said contact material into the upper section of said supply zone above the level of the bed therein, dividing said stream vertically and transversely of its horizontal width thereby to form a plurality of aliquot representative components, deflecting the flow of said components to cause them to converge into a single stream, passing said single stream of contact material down a sloping path and downwardly withdrawing contact material as a plurality of confined aliquot representative streams from a plurality of locations uniformly spaced apart adjacent the lower edge of said sloping path, directing said confined streams downwardly to a plurality of points within said supply zone above the surface of said bed and uniformly spaced with respect the horizontal cross-sectional area of said bed and downwardly showering the contact material from said points onto the surface of said bed.

3. In a cyclic process for the conversion of hydrocarbons wherein a particle-form solid contact material is passed cyclically through a first reaction zone wherein it moves downwardly as a substantially compact column while being contacted with hydrocarbon reactants to effect the conversion thereof and through a second reaction zone wherein it moves downwardly as a substantially compact column while being contacted with a combustion supporting gas to burn off of the contact material carbonaceous material deposited thereon in the first reaction zone, the method for uniformly distributing the contact material onto the column thereof in one of said zones which comprises: maintaining a substantially compact supply bed of said contact material in a confined supply zone above and communicating with the column of contact material in said conversion zone through a plurality of uniformly spaced vertical, compact, gravitating streams of contact material, passing a single downwardly sloping stream of said contact material into the upper section of said supply zone above the level of the bed therein, dividing said stream vertically and transversely of its horizontal width along a plurality of horizontally spaced vertical planes whereby said stream is subdivided into a plurality of separate streams in all of which the apportionment of particle sizes is substantially the same, deflecting the direction of flow of said streams to effect a convergence thereof into a single downwardly flowing mixed stream, passing the major portion of said stream of contact material down an inclined surface and collecting the contact material at the lower end of said surface in a series of confined downwardly extending passages equally spaced apart along the lower end of said surface, discharging the contact material from said passages at a plurality of points above said bed in said supply zone and substantially uniformly distributed with respect the horizontal cross-sectional area of said supply zone except for a central area, showering the contact material discharged from said passages downwardly onto the surface of said bed, passing the remaining portion of said single mixed stream vertically downwardly in a confined passage to a centrally located point above said bed and showering said contact material from said central point downwardly onto said bed, wherein the amount of contact material showering onto said bed from said central point is substantially greater than that showering onto the bed from any other point but only a minor fraction of the total contact material showering onto said bed from all of said points.

4. In a cyclic process for the conversion of hydrocarbons wherein a particle-form solid contact material is passed cyclically through a first reaction zone wherein it moves downwardly as a substantially compact column while being contacted with hydrocarbon reactants to effect the conversion thereof and through a second reaction zone wherein it moves downwardly as a substantially compact column while being contacted with a combustion supporting gas to burn off of the contact material carbonaceous material deposited thereon in the first reaction zone, the method for uniformly distributing the contact material onto the column thereof in one of said zones which comprises: maintaining a substantially compact supply bed of said contact material in a confined supply zone above and communicating with the column of contact material in said conversion zone through at least one vertical compact, gravitating stream of contact material, passing a single downwardly sloping stream of said contact material into the upper section of said supply zone above the level of the bed therein, dividing said stream vertically and at right angles to its horizontal width along a plurality of parallel planes whereby said single stream is divided into a plurality of separate streams in all of which the apportionment of particle sizes is substantially the same, deflecting the direction of flow of said streams to effect a convergence thereof into single downwardly flowing mixed stream, passing the major portion of said stream of contact material down an inclined frusto-conical surface and collecting the contact material at the lower end of said surface in a series of confined downwardly extending passages equally spaced in a circle around the lower end of said surface, slowly oscillating said surface with respect said mixed stream so as to expose only a minor portion of the frusto-conical surface to the flow of contact material at any instant, discharging the contact material from said passages at a plurality of points above said bed in said supply zone and substantially uniformly distributed with respect the horizontal cross-sectional area of said supply zone except for a central area, showering the contact material discharged from said passages downwardly onto the surface of said bed, passing the remaining portion of said single mixed stream vertically downwardly in a confined passage to a centrally located point above said bed and showering said contact material from said central point downwardly onto said bed wherein the amount of contact material showering onto said bed from said central point is substantially greater than that showering onto the bed from any other point but only a minor fraction of the total contact material showering onto said bed from all of said points.

5. A continuous cyclic process for the catalytic conversion of hydrocarbons comprising: passing an adsorbent catalyst consisting of particles of different sizes downwardly through a confined conversion zone as a substantially compact column while passing fluid hydrocarbon reactants through said column to effect conversion thereof, maintaining a separate column of downwardly moving catalyst in a confined regeneration zone in contact with a combustion supporting gas to burn carbonaceous contaminants from said catalyst, maintaining a bed of spent catalyst in a spent catalyst supply zone vertically above said column in said regeneration zone and communicating therewith through a plurality of uniformly distributed gravitating streams of catalyst withdrawing spent catalyst from said conversion zone and conveying it upwardly to a location above said spent catalyst supply zone, passing spent catalyst as a single downwardly sloping stream of substantial width to a point within said supply zone above the surface of the bed therein, directing said stream against a plurality of side by side vertical obstructions spaced apart side by side across the width of said stream, whereby part of said stream is deflected by said obstructions and part passes between said obstructions so that said stream is thereby divided into two sets of streams each set comprising a plurality of streams wherein the catalyst particle sizes are apportioned substantially the same as in said first named single stream, the streams in said two sets gravitating downwardly in oppositely sloping directions, deflecting the flow of said sets of streams to effect a turbulent mergence of said streams into a single mixed stream, flowing said single stream downwardly in a radially expanding sloping path, withdrawing catalyst downwardly as a plurality of confined streams extending downwardly from a series of points equally spaced around the periphery of the lower end of said sloping radially expanding path, directing said confined streams to a plurality of points above said bed in said supply zone which points are uniformly distributed over the horizontal cross-sectional area of said supply zone and showering the catalyst from said points downwardly onto said bed.

6. A method for distributing granular solid material onto a substantially compact moving bed thereof from a source of said solid material spaced laterally of and above said bed which comprises, flowing said solid material from said source down an inclined surface as a single primary stream of substantially horizontal width to a location above said bed, impinging said stream against a plurality of horizontally spaced apart vertical baffles arranged in a single horizontal row extending transversely to the width of said stream, whereby spaced apart portions of said stream are deflected downwardly in one direction while the remaining portions pass downwardly between said baffles in the opposite direction, thereby effecting the division of said single stream into a plurality of aliquot representative separate components, changing the direction of flow of said components to effect a turbulent mergence thereof into a single downwardly flowing stream, redividing said last named stream into a plurality of downwardly flowing confined streams, directing said plurality of confined streams to a plurality of points above said bed and substantially uniformly distributed with respect the projected horizontal cross-sectional area of said bed and passing the solid material from said points downwardly onto the surface of said bed.

7. In combination a vertical vessel adapted for downward movement therethrough of a substantially compact bed of particle-form solid material, a source of said solid spaced above and laterally of said vessel, a supply duct sloping downwardly from said source to a location within the upper section of said vessel, a baffle having vertical, downwardly extending fingers with openings therebetween positioned opposite the lower end of and transversely of said supply duct, a box enclosing said baffle, two opposite vertical sides of said box being parallel to said baffle and being spaced horizontally from said baffle, said box extending downwardly below the lower edge of said baffle, said box having an opening substantially centrally located in its bottom, a basin having upwardly extending sides positioned in said vessel below said box, said basin being of substantially greater horizontal cross-sectional area than said opening in the bottom of said box but of less horizontal cross-sectional area than said vessel, and said basin being so positioned with respect said opening that a line drawn downwardly from any edge of said opening at an angle with the horizontal of about 35° intersects the nearest side of said basin below its upper edge, a plurality of conduits depending downwardly from said basin and terminating at a plurality of spaced points in the upper section of said vessel uniformly distributed over its horizontal cross-sectional area.

8. In combination a vertical vessel adapted for downward movement therethrough of a substantially compact bed of granular solid material, a mixing box having a closure on its lower end positioned centrally within the upper section of said vessel, a series of vertical finger baffles spaced in a row transversely across the central portion of said box and terminating on their lower ends substantially above the bottom closure of said box, a centrally located opening in said bottom closure, a source for solid material spaced above and laterally of said vessel, a supply duct having a flat bottom sloping downwardly from said source to a location opposite said finger baffles in said mixing box at a level substantially above the lower ends of said finger baffles, a basin positioned directly below said opening in said bottom closure adapted to catch the solid material flowing therethrough, a plurality of passage defining members depending downwardly from the bottom of said basin and terminating at a plurality of spaced locations in the upper section of said vessel which locations are uniformly distributed with respect the horizontal cross-sectional area of said vessel.

9. In combination a vertical vessel adapted for downward movement therethrough of a substantially compact bed of granular solid material, a mixing box having a closure on its lower end positioned centrally within the upper section of said vessel, a series of vertical finger baffles spaced in a row transversely across the central portion of said box and terminating on their lower ends substantially above the bottom closure of said box, a centrally located opening in said bottom closure, a source for solid material spaced above and laterally of said vessel, a supply duct having a flat bottom sloping downwardly from said source to a location opposite said finger baffles in said mixing box at a level substantially above the lower ends of said finger baffles, a basin positioned directly below said opening in said bottom closure adapted to catch the solid material flowing therethrough, a hollow, upright frusto-conical baffle positioned on the bottom of said basin substantially centrally below said opening in said bottom closure, said frusto-conical baffle having an opening on its upper base and the diameter of said last named opening being less than that of said opening in said bottom closure, and the lower base of said frusto-conical baffle being of less transverse dimension than said basin, a plurality of passage defining members depending from spaced points on the bottom of said basin arranged in a ring adjacent the base of said frusto-conical baffle, said passage defining members terminating at a plurality of spaced locations in the upper section of said vessel, which locations are uniformly distributed with respect the horizontal cross-sectional area of said vessel except for a central area, a conduit extending centrally downwardly from said basin, said last named conduit being laterally positioned substantially centrally of said vessel.

10. In combination a vertical vessel adapted for downward movement therethrough of a substantially compact bed of granular solid material, a mixing box having a closure on its lower end positioned centrally within the upper section of said vessel, a series of vertical finger baffles spaced in a row transversely across the central portion of said box and terminating on their lower ends substantially above the bottom closure of said box, said bottom closure having therein a centrally located opening, a source for solid material spaced above and laterally of said vessel, a supply duct having a flat bottom sloping downwardly from said source to a location opposite said finger baffles in said mixing box at a level substantially above the lower ends of said finger baffles, a basin adapted to be oscillated in a circular path suspended in said vessel directly below said opening to catch the solid material flowing therethrough, a plurality of passage defining members depending from the bottom of said basin from a plurality of points arranged in a ring and terminating below said basin in the upper section of said vessel at a plurality of points substantially uniformly spaced over the horizontal cross-sectional area of said vessel, means to oscillate said basin in a circular path below said bottom closure in said mixing box to effect the revolution of the vertical axis of said ring of points from which the passage defining members depend around the vertical axis of said opening in said bottom closure.

11. In combination a vertical vessel adapted for downward movement therethrough of a substantially compact bed of granular solid material, a mixing box having a closure on its lower end positioned centrally within the upper section of said vessel, a series of vertical finger baffles spaced in a row transversely across the central portion of said box and terminating on their lower ends substantially above the bottom closure of said box, said bottom closure having a centrally located opening therein, a source for solid material spaced above and laterally of said vessel, a supply duct having a flat bottom sloping downwardly from said source to a location opposite said finger baffles in said mixing box at a level substantially above the lower ends of said finger baffles, a basin movably suspended within the upper section of said vessel below said opening in said bottom closure said basin being positioned to catch all the solid material flow from said opening, a hollow upright frusto-conical baffle positioned on the bottom of said basin with its vertical axis horizontally offset from that of said opening in said bottom closure, said frusto-conical baffle being open on its upper base, the opening being only partially under the opening in said bottom closure and said frusto-conical baffle being of less diameter at its bottom base than said basin, a plurality of passage defining members depending from the bottom of said basin from a plurality of spaced points arranged in a circle adjacent the bottom base of said frusto-conical baffle, said passage defining members terminating at a plurality of spaced locations in the upper section of said vessel, which locations are uniformly distributed with respect the horizonal cross-sectional area of said vessel except for a central area thereof, a conduit extending downwardly from the central portion of said basin and terminating in said central area in said vessel, a mechanical oscillator adapted to oscillate said basin in a horizontal circular path so that the vertical axis of said frusto-conical baffle rotates about that of said opening in said bottom closure, and connecting members connecting said oscillator to said basin.

12. In combination a vertical vessel adapted for downward movement therethrough of a substantially compact bed of granular solid material, a mixing box having a closure on its lower end positioned centrally within the upper section of said vessel, a vertical baffle having downwardly extending spaced fingers with openings therebetween positioned across in said mixing box substantially midway between two opposite sides of said box, said baffle terminating substantially above the bottom closure of said box, said bottom closure having a central circular opening therein, a source for solid material spaced above and laterally of said vessel, a supply duct having a flat bottom sloping downwardly from said source to a location in said mixing box opposite said vertical baffle and at a level near the upper portions of said fingers, a basin movably suspended within the upper section of said vessel below said opening in said bottom closure said basin being positioned to catch all the solid material flow from said opening, a hollow upright frusto-conical baffle positioned on the bottom of said basin with its vertical axis horizontally offset from that of said opening in said bottom closure, said frusto-conical baffle being open on its upper base, the opening being only partially under the opening in said bottom closure and said frusto-conical baffle being of less diameter at its bottom base than said basin, a plurality of passage defining members depending from the bottom of said basin from a plurality of spaced points arranged in a circle adjacent the bottom base of said frusto-conical baffle, said passage defining members terminating at a plurality of spaced locations in the upper section of said vessel, which locations are uniformly distributed with respect the horizontal cross-sectional area of said vessel except for a central area thereof, a plurality of differently sloping finger baffles connected to the lower end of each of said passage defining members, a conduit extending downward into said central area from a point on said basin bottom within the horizontal area enclosed by the upper base of said frusto-conical baffle, a rotatable crank arm adapted to oscillate said basin in a circular path of about the same diameter as the top base opening of said frusto-conical baffle, the center point of said circular path being on the same vertical axis as said opening in said bottom closure and the radius of said circular path being less than the diameter of the top base opening of said frusto-conical baffle, connecting members connecting said crank arm to said basin and means to rotate said crank arm.

13. In combination a vertical vessel adapted for downward movement therethrough of a substantially compact bed of particle-form solid material, a source of said solid spaced above and laterally of said vessel, a supply duct sloping downward from said source to a location within the upper section of said vessel, a mixing device in the upper section of said vessel adapted to mix the solid flow from said supply duct, said mixing device having a centrally located bottom outlet for solid material discharge therefrom, a basin movably suspended within the upper section of said vessel below said opening in said bottom closure said basin being positioned to catch all the solid material flow from said opening, a hollow upright frusto-conical baffle positioned on the bottom of said basin with its vertical axis horizontally offset from that of said opening in said bottom closure, said frusto-conical baffle being open on its upper base, the opening being only partially under the opening in said bottom closure and said frusto-conical baffle being of less diameter at its bottom base than said basin, a plurality of passage defining members depending from the bottom of said basin from a plurality of spaced points arranged in a circle adjacent the bottom base of said frusto-conical baffle, said passage defining members terminating at a plurality of spaced locations in the upper section of said vessel, which locations are uniformly distributed with respect the horizontal cross-sectional area of said vessel except for a central area thereof, a conduit extending downward from the central portion of said basin and terminating in said central area in said vessel, a mechanical oscillator adapted to oscillate said basin in a horizontal circular path so that the vertical axis of said frusto-conical baffle rotates about that of said opening in said bottom closure and connecting members connecting said oscillator to said basin.

ERIC V. BERGSTROM.

REFERENCES CITED

The following references are of record in the file of this patent:

UNITED STATES PATENTS

| Number | Name | Date |
|---|---|---|
| 955,615 | Stone et al. | Apr. 19, 1910 |
| 2,438,261 | Utterback | Mar. 23, 1948 |